United States Patent
Muchalov

(10) Patent No.: US 6,883,659 B2
(45) Date of Patent: Apr. 26, 2005

(54) CONVEYOR TRANSFER ASSEMBLY

(76) Inventor: Ivan Muchalov, 5825 Tenth Line, Erin, ON (CA), N0B 1T0

( * ) Notice: Subject to any disclaimer, the term of this patent is extended or adjusted under 35 U.S.C. 154(b) by 48 days.

(21) Appl. No.: 10/608,614

(22) Filed: Jun. 30, 2003

(65) Prior Publication Data

US 2004/0262124 A1 Dec. 30, 2004

(51) Int. Cl.$^7$ ............................................... B65G 47/10
(52) U.S. Cl. ............................... 198/371.2; 198/370.07; 198/370.01; 198/370.06
(58) Field of Search .......................... 198/370.1, 371.2, 198/370.06, 370.01, 370.07, 588, 812, 605

(56) References Cited

U.S. PATENT DOCUMENTS

| | | | | |
|---|---|---|---|---|
| 2,830,693 | A | * | 4/1958 | Schlossmacher ......... 198/371.2 |
| 3,690,435 | A | | 9/1972 | King et al. |
| 3,913,766 | A | | 10/1975 | Ramsey |
| 4,119,193 | A | * | 10/1978 | Smith et al. ............. 198/371.2 |
| 4,210,237 | A | | 7/1980 | Gram |
| 4,478,329 | A | | 10/1984 | Heiz |
| 4,930,613 | A | * | 6/1990 | Okura et al. ........... 198/370.06 |
| 5,168,978 | A | | 12/1992 | Cox et al. |
| 5,617,944 | A | | 4/1997 | McTaggart |
| 5,715,930 | A | | 2/1998 | Hogenkamp |
| 5,984,078 | A | * | 11/1999 | Bonnet ..................... 198/370.1 |
| 6,116,842 | A | | 9/2000 | Harris et al. |
| 6,152,284 | A | | 11/2000 | Sandberg et al. |
| 6,264,042 | B1 | | 7/2001 | Cossey, Jr. et al. |
| 6,505,733 | B1 | | 1/2003 | Troupos et al. |
| 6,508,153 | B1 | | 1/2003 | Lumberg et al. |
| 2002/0060133 | A1 | | 5/2002 | Itoh |

FOREIGN PATENT DOCUMENTS

| | | |
|---|---|---|
| DE | 1259781 B | 1/1968 |
| FR | 1593129 A | 5/1970 |

* cited by examiner

Primary Examiner—James R. Bidwell
(74) Attorney, Agent, or Firm—Marks & Clerk

(57) ABSTRACT

The invention described herein is transfer assembly for transferring articles from an input conveyor to an output position. The transfer assembly includes a support structure and a conveyor assembly mounted to the support structure. The conveyor assembly has a working conveyor surface with an input end and an output end. The output end is moveable in a substantially lateral direction between a first position and a second position. The first position is such that the working conveyor surface is substantially laterally positioned away from the output position while the second position is such that a portion of the working conveyor surface is positioned above the output position.

17 Claims, 16 Drawing Sheets

CONVEYOR TRANSFER ASSEMBLY

FIELD OF THE INVENTION

This invention relates to the field of conveyer systems and more specifically to conveyor transfer assemblies.

BACKGROUND OF THE INVENTION

Manufacturing operations or plants will often include conveyor systems for moving parts from one location to another. At each location, the parts may be machined or subject to similar operations, inspected, assembled painted or packaged among other operations. The smooth operation of the plant is dependent on the timing of each of the operations to which a part may be subjected. For example if a particular machine processes parts at a certain rate, the next stage of the operation, ideally, should also process those parts at the same rate. Otherwise, the faster machine's operations will have to be stopped to allow the slower machine to process the parts.

There are many times, however, when a particular upstream portion of a process is faster than the downstream portion of the process due to inherent limitations in the downstream process. For example, in some situations a particular part needs to be inspected after it is processed. Human inspection can be much slower than an upstream machine-based process. Therefore, additional workers will have to be employed to undertake the inspection so as not to adversely affect the rate of manufacture. Therefore, a multitude of conveyance pathways may be needed to accommodate the workers. There are other situations where the output of a portion of a process needs to be split into two or more lines. One such situations may be to accommodate a slower downstream process.

There are a wide variety of methods which have been used to accomplish the task of conveyor splitting. Some involve the use of high speed robot arms which are cable of grasping and placing parts on different conveyor pathways. Others involve the use of complex perpendicular conveyor belt patterns which may be raised and lowered with respect to one another.

The main disadvantage of prior art conveyor assemblies is their complexity and the difficulty of constructing such conveyor systems. In addition, many systems are not suited to transporting large stamped parts with protruding sharp points and tabs. These protrusions may get caught in roller systems. In many situations, for example in the auto industry, the use of complex conveying for the transport of large stamped parts is actually accomplished with manual labour. The auto workers in such situations will often simply grab the parts from the output conveyor and manually transfer them to the two receiving conveyors. These systems are fraught with risk of physical danger and possible damage of the parts. The present invention provides an effective means of transferring manufactured articles from an output lane into two or more receiving lanes.

SUMMARY OF THE INVENTION

The invention described herein is transfer assembly for transferring articles from an input conveyor to an output position.

The transfer assembly includes a support structure and a conveyor assembly mounted to the support structure. The conveyor assembly has a working conveyor surface with an input end and an output end. The output end is moveable in a substantially lateral direction between a first position and a second position. The first position is such that the working conveyor surface is substantially laterally positioned away from the output position while the second position is such that a portion of the working conveyor surface is positioned above the output position.

The transfer assembly also includes a linear actuator mounted to the output end. The linear actuator is adapted for moving the output end between the first position and the second position. A conveyor controller assembly is coupled to the conveyor surface. The conveyor controller assembly is adapted to selectively translate the working conveyor surface with respect to the input end as well as to selectively maintain at least a portion of the conveyor surface stationary with respect to the support structure.

In a variation of the present invention, the conveyor controller assembly includes a first conveyance actuator adapted to selectively translate the conveyor surface with respect to the input end. Further, the conveyor controller assembly may also include a conveyor stop for selectively maintaining at least a portion of the conveyor surface stationary with respect to the support structure when the linear actuator is moving the output end. The conveyor stop may be a clamp positioned about the working conveyor surface, where the clamp is operable to releasably grasp a portion of the working conveyor surface.

The conveyor controller may also include a second conveyance actuator adapted to selectively translate the working conveyor surface with respect to the input end in a direction opposite to that of the first conveyance actuator.

As well, the linear actuator may be adapted to move the output end at a first speed in a first direction, and second conveyance actuator may be adapted to selectively translate the working conveyor surface with respect to the input end at a rate substantially equal to the first speed in a second direction. The second direction is opposite to the first direction so that when the linear actuator is activated in a first direction and the second conveyance actuator is activated to translate the working conveyor surface in the second direction, a portion of the working conveyor surface is stationary with respect to the support structure.

In a further embodiment, the working conveyor surface has a fixed length in the lateral direction as the output end is moved from the first position and the second position.

In yet another embodiment, the working conveyor surface has a variable length in the lateral direction when the output end is moved from the first position and the second position. The input end may be mounted to a fixed position with respect to the support structure.

In a further variation, the conveyor assembly includes at least two conveyor rollers and a conveyor belt looped around the conveyor rollers and the working conveyor surface is an uppermost surface of the conveyor belt. The conveyor controller assembly may include a motor mounted to rotate one of the conveyor rollers.

In a yet further embodiment, the conveyor assembly includes a series of parallel cylindrical rollers where the working conveyor surface is the combination of the upper portions of the parallel cylindrical rollers. The conveyor controller assembly may include a motor mounted to rotate at least one of the conveyor rollers.

In a still further embodiment an electronic controller may be included for activating the linear actuator and for operating the conveyor control assembly.

The subject invention is also directed to a process for transferring articles from an input conveyor to an output position using a transfer assembly. The transfer assembly has a support structure and a conveyor assembly mounted thereon. The conveyor assembly has a working conveyor surface extending between an input end and an output end and the output end is movable between a first position and a second position. The first position is such that the working conveyor surface is substantially laterally positioned away from the output position while the second position is such that a portion of the working conveyor surface is positioned above the output position. The process includes the following steps:

(a) the article is transported along the input conveyor towards the transfer assembly in a generally lateral direction;

(b) the working conveyor surface is translated with respect to the support structure in the generally lateral direction;

(c) the article is then transferred from the input conveyor to the working conveyor surface;

(d) the output end is moved to the second position;

(e) translating the working conveyor surface is translated such that the article is positioned substantially above the output position;

(f) at least a portion of the working conveyor surface is maintained stationary with respect to the support structure while the output end is moved to the first position, whereby the article is transported vertically downwardly to the output position.

The output position may be the upper surface of an output conveyor. The output conveyor may be adapted to move in a direction transverse to the generally lateral direction.

Step (f) above may be performed by moving the output end to the first position at a first speed and in a first direction. At the same time the working conveyor surface is translated with respect to the input end at a rate substantially equal to the first speed and in a direction opposite to the first direction.

BRIEF DESCRIPTION OF THE DRAWINGS

The novel features which are believed to be characteristic of the present invention, as to its structure, organization, use and method of operation, together with further objectives and advantages thereof, are better understood from the following drawings in which the presently preferred embodiment of the invention is shown by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE INVENTION

Figure 1:
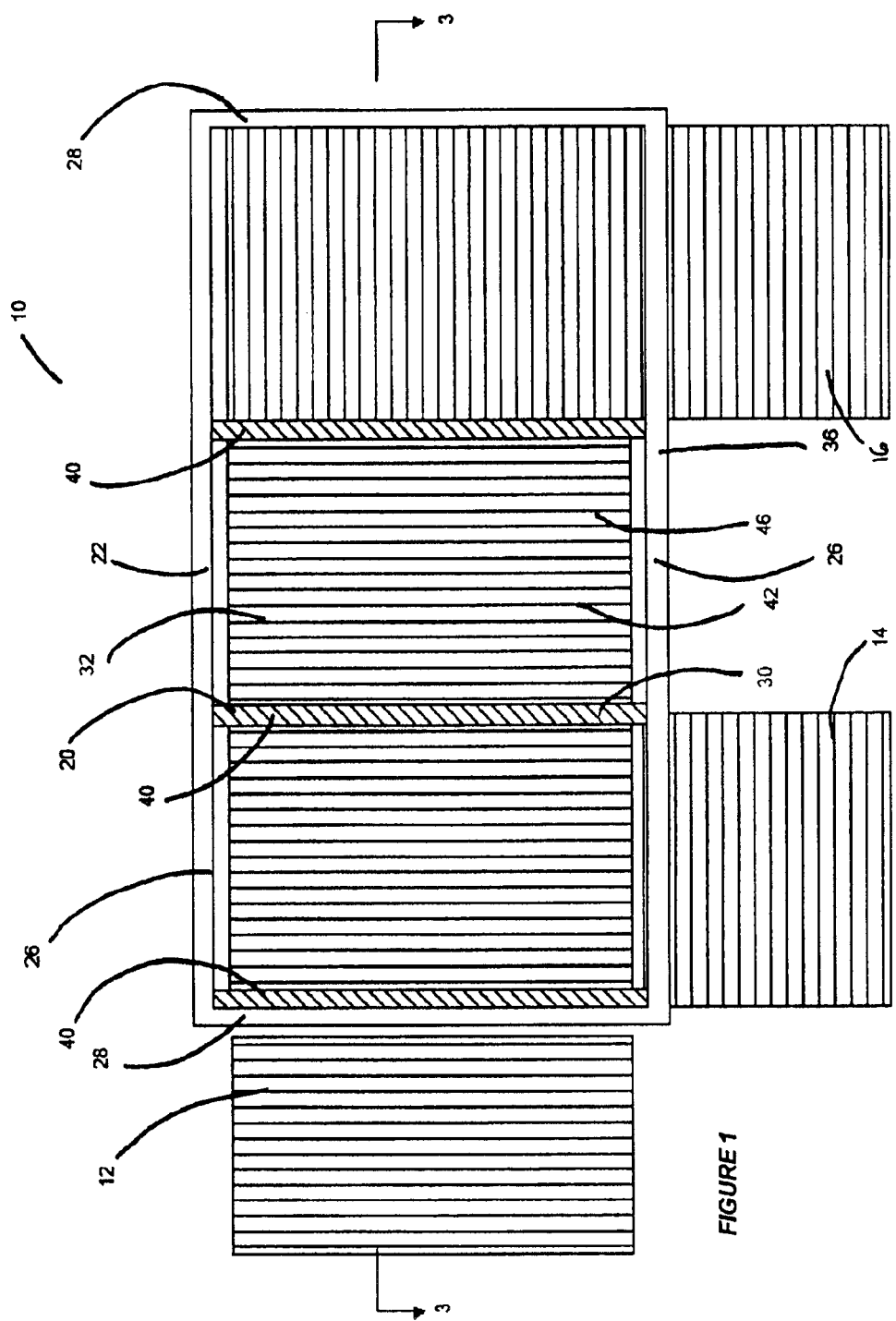
FIG. 1 is a top view of a conveyor transfer assembly in accordance with a preferred embodiment of the present invention.
Figure 2:
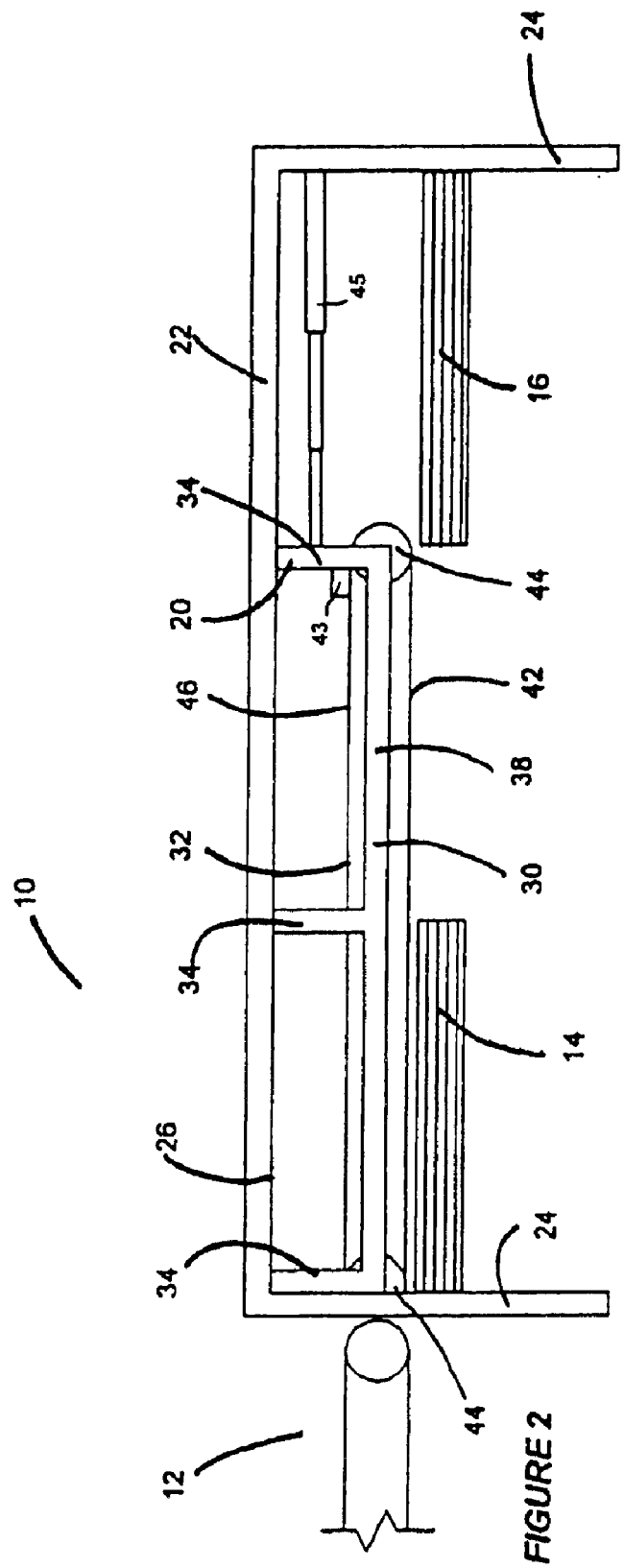
FIG. 2 is a side view of the conveyor transfer assembly of FIG. 1.
Figure 3:
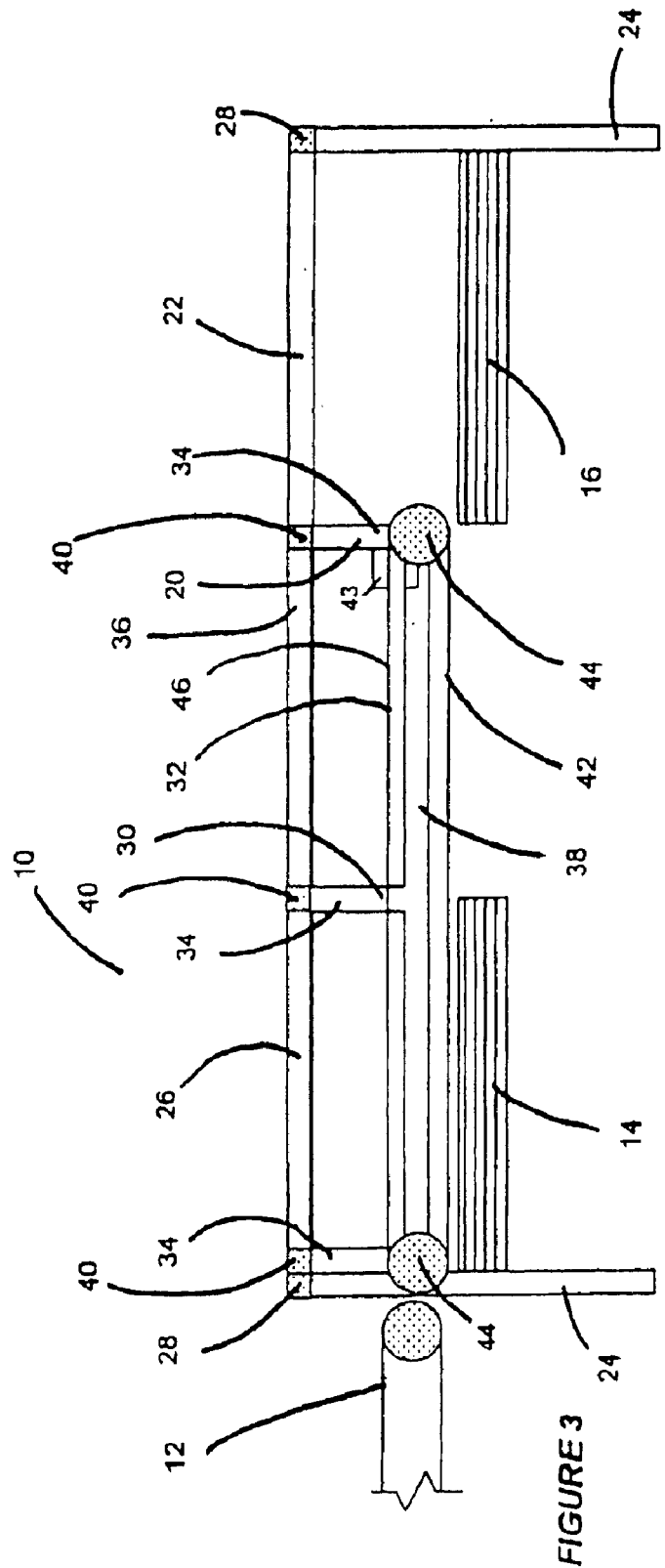
FIG. 3 is a sectional side view of the conveyor transfer assembly of FIG. 1 taken along Line 3—3.

FIGS. 1, 2 and 3 show a preferred embodiment of a conveyor transfer assembly 10 in accordance with the present invention.

Figure 4:
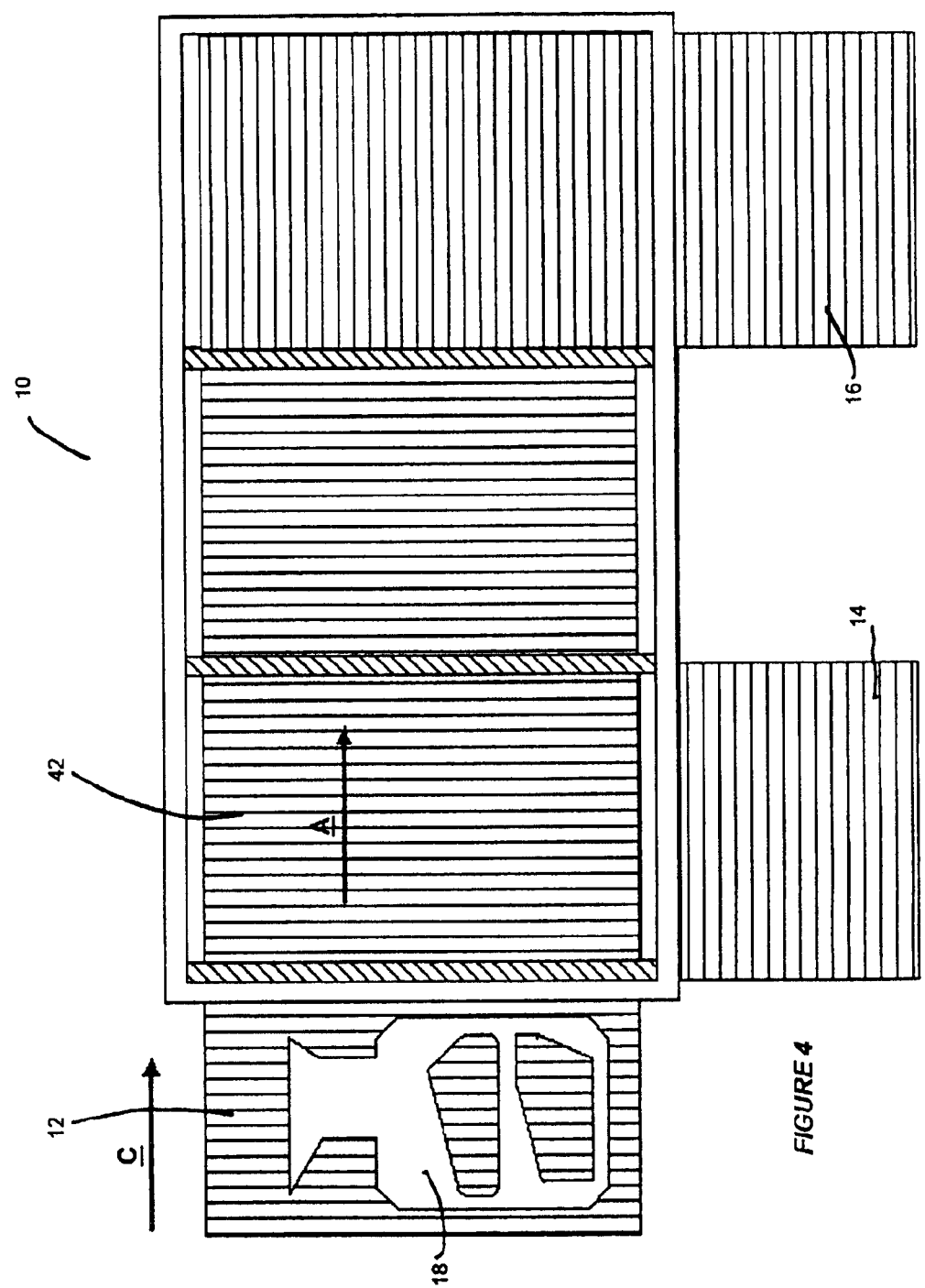
FIGS. 4 to 13 show the stepwise operation of the conveyor transfer assembly of FIG. 1.

FIG. 1 shows the conveyor transfer assembly 10, an input conveyor 12 and a first and a second output conveyors 14 and 16, respectively. Conveyor transfer assembly 10 is used for the transport of a workpiece 18 (as shown in FIG. 4) from input conveyor 12 to first or second output conveyors 14 and 16.

Conveyor transfer assembly 10 is composed of a conveyor assembly or carriage assembly 20 mounted to a support structure in the nature of support frame 22. Support frame 22 is a generally rectangular frame composed of four support legs 24 supporting a rectangular upper portion of the frame composed of a pair of parallel lateral track rails 26 and a pair of transverse support members 28. Transverse support members 28 are perpendicular to lateral track rails 26 and connect to form a rectangular shape. Optionally, additional support members may be used to stabilize support frame 22.

Carriage assembly 20 is composed of a carriage frame 30 and a belt assembly 32. Carriage frame 30 is rectangular grid like structure. Carriage frame 30 is a composed of vertical carriage members 34 which connect an upper runner carriage bar 36 to a lower carriage bar 38. A pair of upper and lower carriage bars 36 and 38 are connected to one another by a three parallel transverse carriage members 40. Carriage frame 30 is mounted to support frame 22 through a slidable interconnection of upper runner carriage bar 36 and lateral track rails 26.

Belt assembly 32 is composed of conveyor belt 42 and rollers 44. Rollers 44 are mounted between the intersection of the endmost vertical carriage members 34 and lower carriage bar 38. Rollers 44 extend between the ends of lower carriage bars 38. A endless belt or laced belt in the nature of conveyor belt 42 is wrapped around rollers 44 such that the belt is under tension. Conveyor belt 42 presents an upper working surface 46 or working conveyor surface upon which workpiece 18 may rest or be transported. Working surface 46 extends between an input end proximate to input conveyor 12 and an output end distal from input conveyor 12.

Carriage assembly 20 is moveable from a first position proximate to the input conveyor 12 to a second position distal from input conveyor 12. Support frame 22 may be sized such that it is at least three times as wide as each of first and second output conveyors 14 and 16. Carriage assembly 20 is preferably sized such that conveyor belt 32 is four times the width of each of first and second output conveyors 14 and 16. However, only half of the length of conveyor belt is the working surface 46 as is shown in FIGS. 2 and 3. The most important factor in sizing, however, is the desired pitch achieved by motion of carriage assembly 20 from the first position to the second position.

First and second output conveyors 14 and 16 are positioned between support legs 24 and vertically below carriage frame 30. First output conveyor 14 is positioned next to the support legs 24 proximate to input conveyor 12 while second output conveyor 16 is positioned proximate to the support legs 24 distal from input conveyor 12. First and second output conveyors 14 and 16 run transverse to input conveyor 12.

Input conveyor 12 may be positioned such that its end point is aligned with belt assembly 30 such that workpiece 18 may travel along a generally single plane from input conveyor 12 to conveyor belt 42. Optionally, input conveyor 12 may be positioned in a plane slightly above conveyor belt 42 to allow for a cascading motion of workpiece 18. Conveyor belt 42 is preferably the same width as input conveyor 12.

Figure 5:
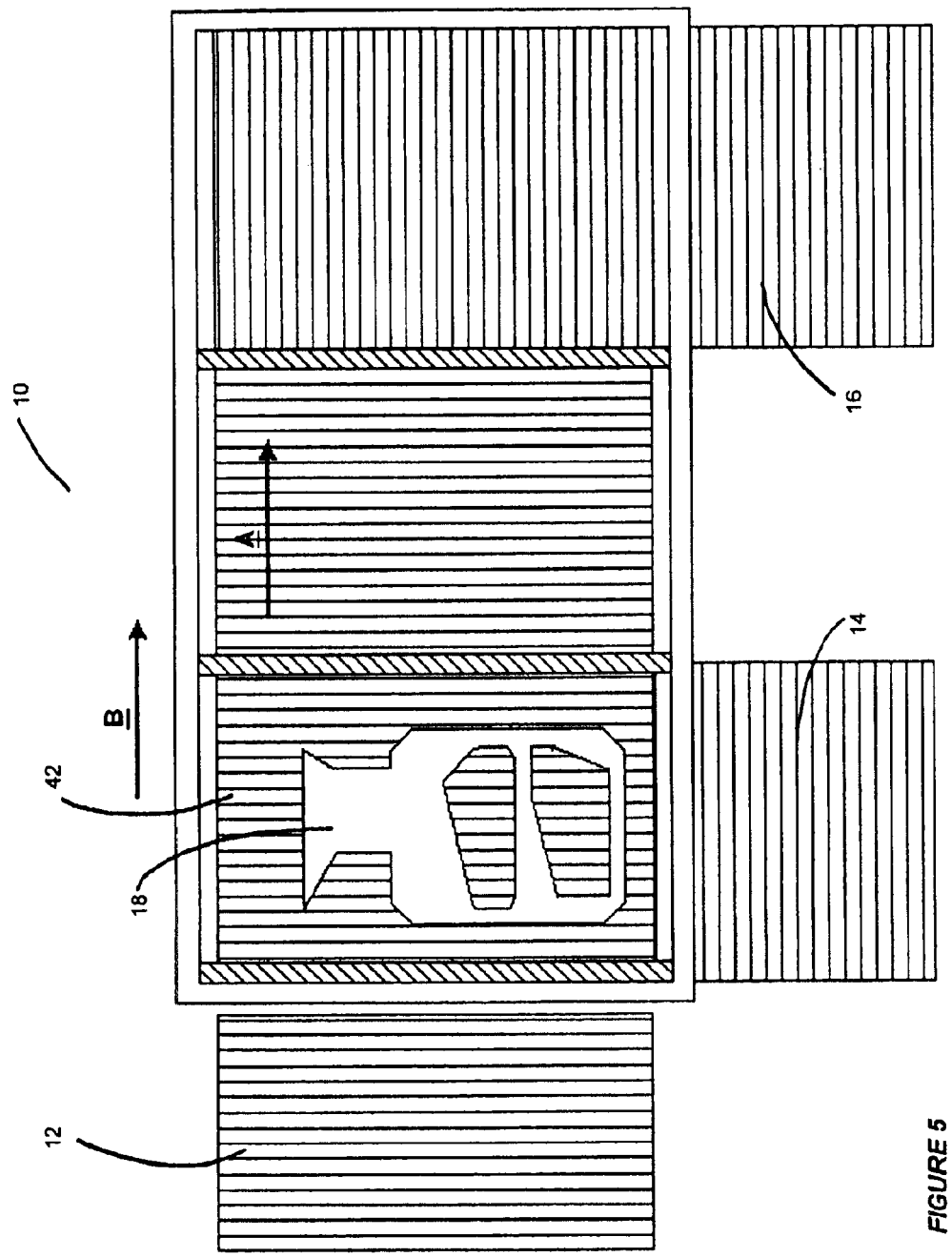
Figure 6:
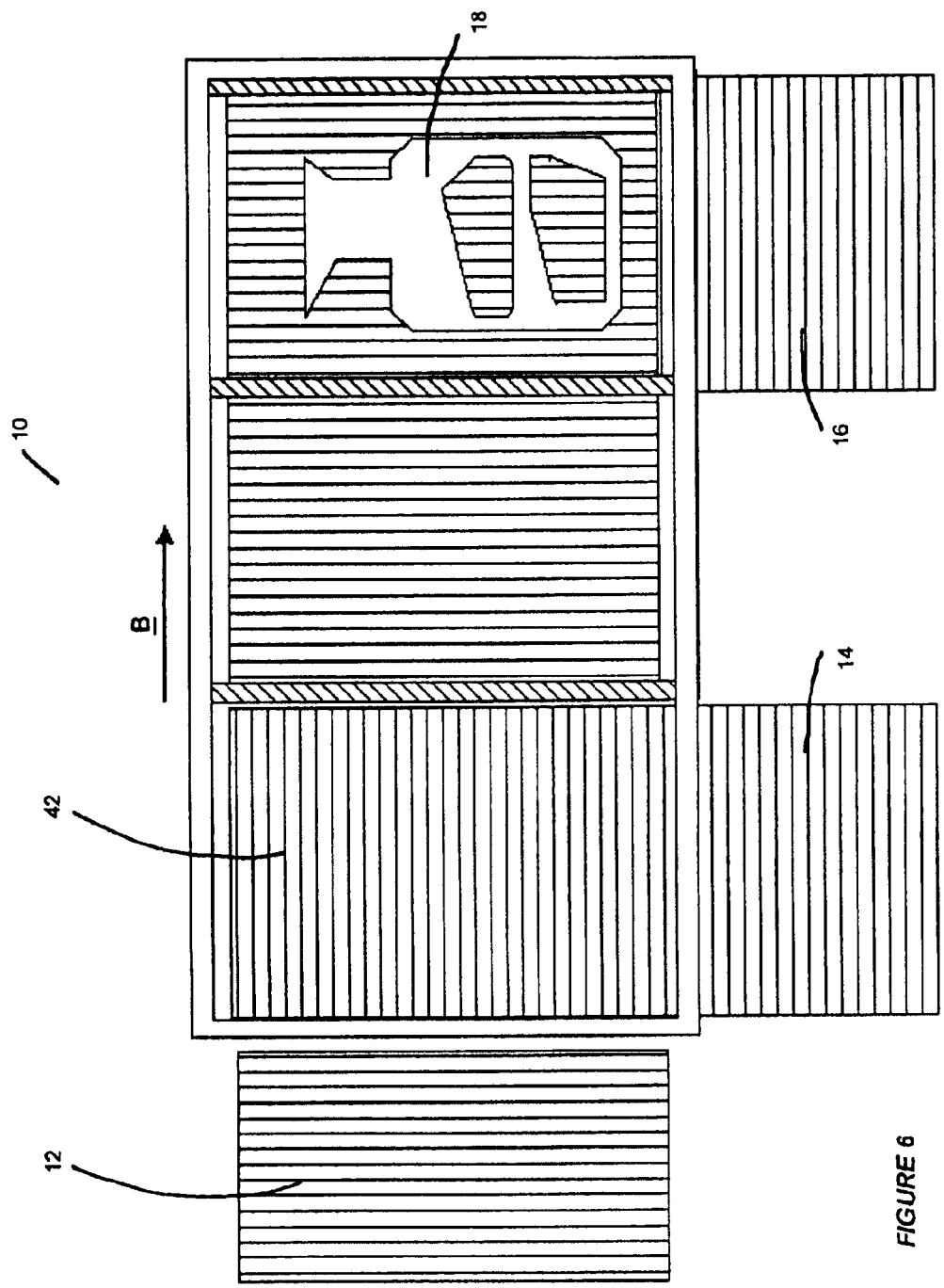
Figure 7:
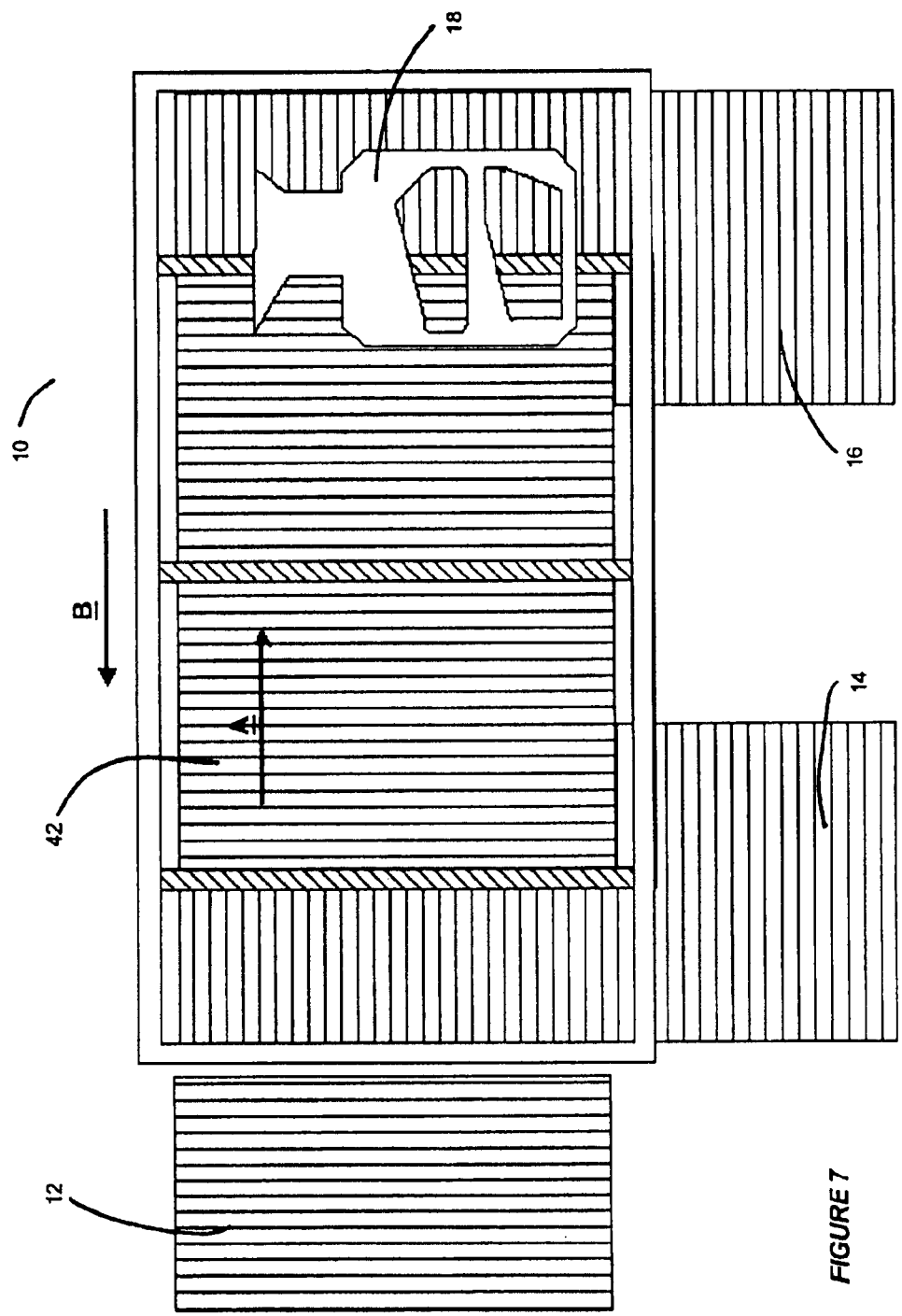
Figure 8:
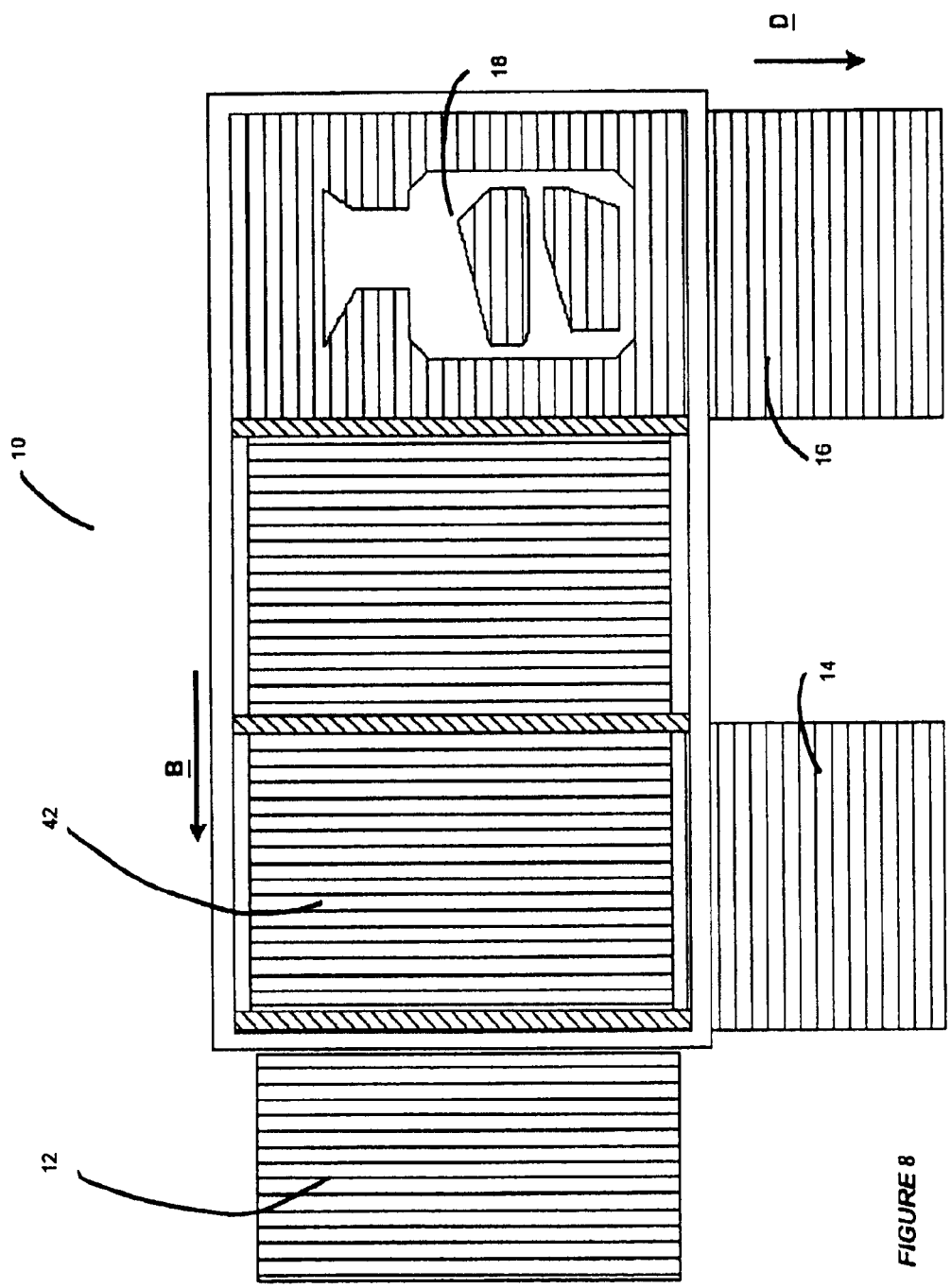

FIGS. 4 through 13 show the sequence of steps in distributing workpiece 18 from input conveyor 12 to first and second output conveyors 14 and 16. Arrow A shows the direction of motion of conveyor belt 42 while arrow B shows the direction of motion of the carriage assembly with respect to support frame 22. For the purposes of describing the transfer process, when conveyor belt 42 is moving such that a workpiece 18 resting on working surface 46 is moved away from input conveyor 12 (i.e. arrow A points to the right in the Figures), the conveyor belt will be described as rotating in the clockwise direction. In FIG. 4, workpiece 18 is travelling to conveyor transfer assembly 10 on input conveyor 12. Conveyor belt 42 is rotating such that its working surface is travelling at the approximately the same speed as the working surface of input conveyor 12. If conveyer belt 42 was operating at a slower rate, workpiece 18 would continue to be pushed from the rear by input conveyor 12 at the faster rate, potentially causing damage to workpiece 18. In FIG. 5, workpiece 18 has been transferred to conveyor belt 42. Conveyor belt 42 is still moving at the same speed as earlier. In addition, carriage assembly 20 begins moving from a first position proximate to input conveyor 12 towards a second position distal from input conveyor 12. In FIG. 6, carriage assembly 20 has moved to the second position and conveyor belt 42 has stopped rotating such that workpiece 18 is resting on conveyor belt 42 directly over second output conveyor 16. FIG. 7 shows carriage assembly 20 moving back towards input conveyor 12. At the same time, conveyor belt 42 again moves in a clockwise direction such that workpiece 18 is removed from conveyor 42 and is deposited on second output conveyor 16. The rate of movement of conveyor 42 is such that the rate of speed of the working surface of conveyor 42 is approximately the same as the rate of speed of the motion of carriage assembly 20. These rates of speeds, being approximately equal but in opposite directions, result in motion of the workpiece in the lateral direction. In this embodiment, workpiece 18 is a relatively flat and large workpiece such that the transfer from the higher elevation of the working surface of conveyor belt 42 to the lower vertical position of second output conveyor 16 does not cause workpiece 18 to flip or otherwise turn during the transfer. FIG. 8 shows workpiece 18 fully resting on second output conveyor 16 and second output conveyor 16 being activated such that it rotates to carry the workpiece 18 away from conveyor transfer assembly 10. Carriage assembly 20 has returned to the first position such as that shown in FIG. 4 and is awaiting the next workpiece 18.

Figure 9:
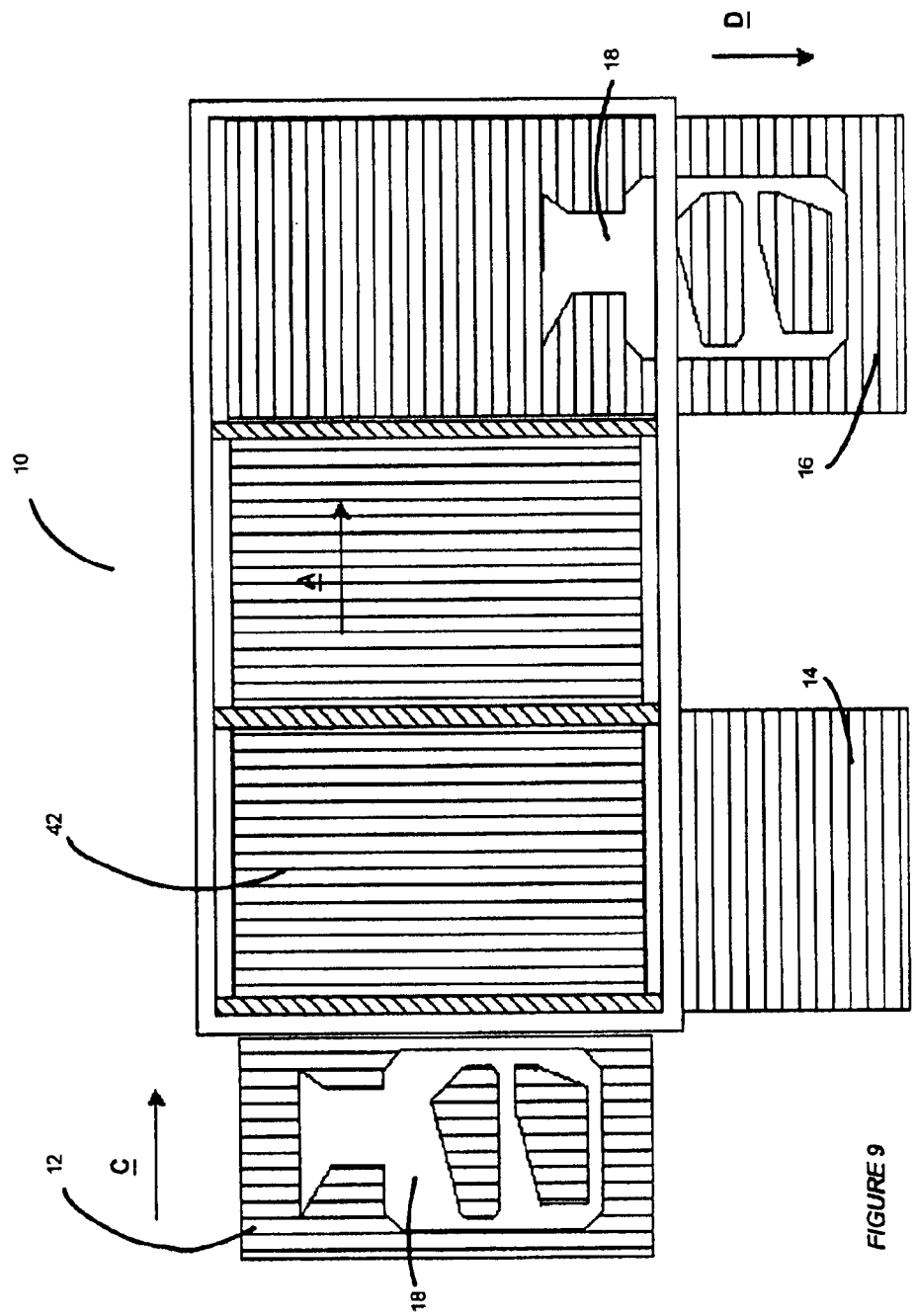
Figure 10:
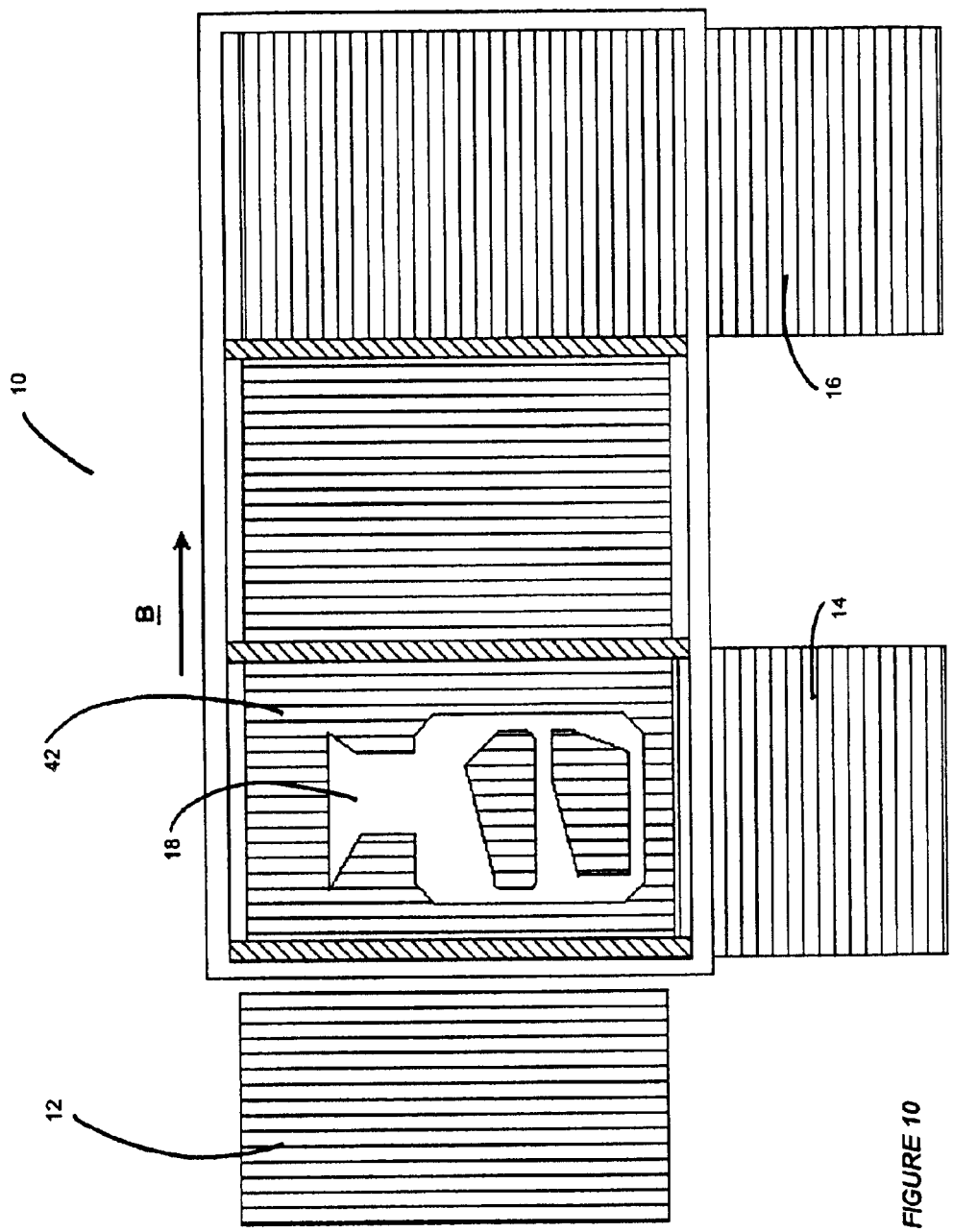
Figure 11:
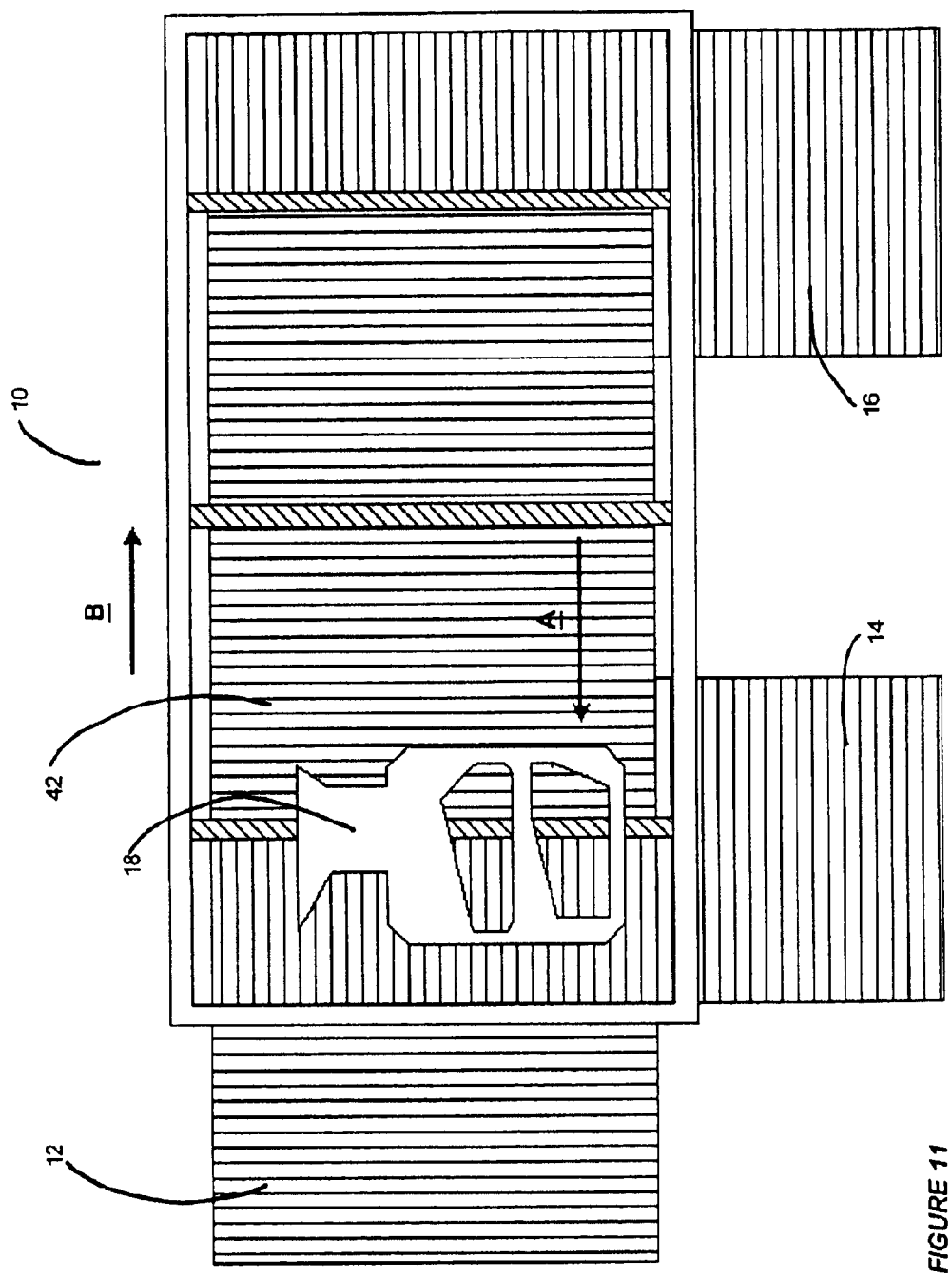
Figure 12:
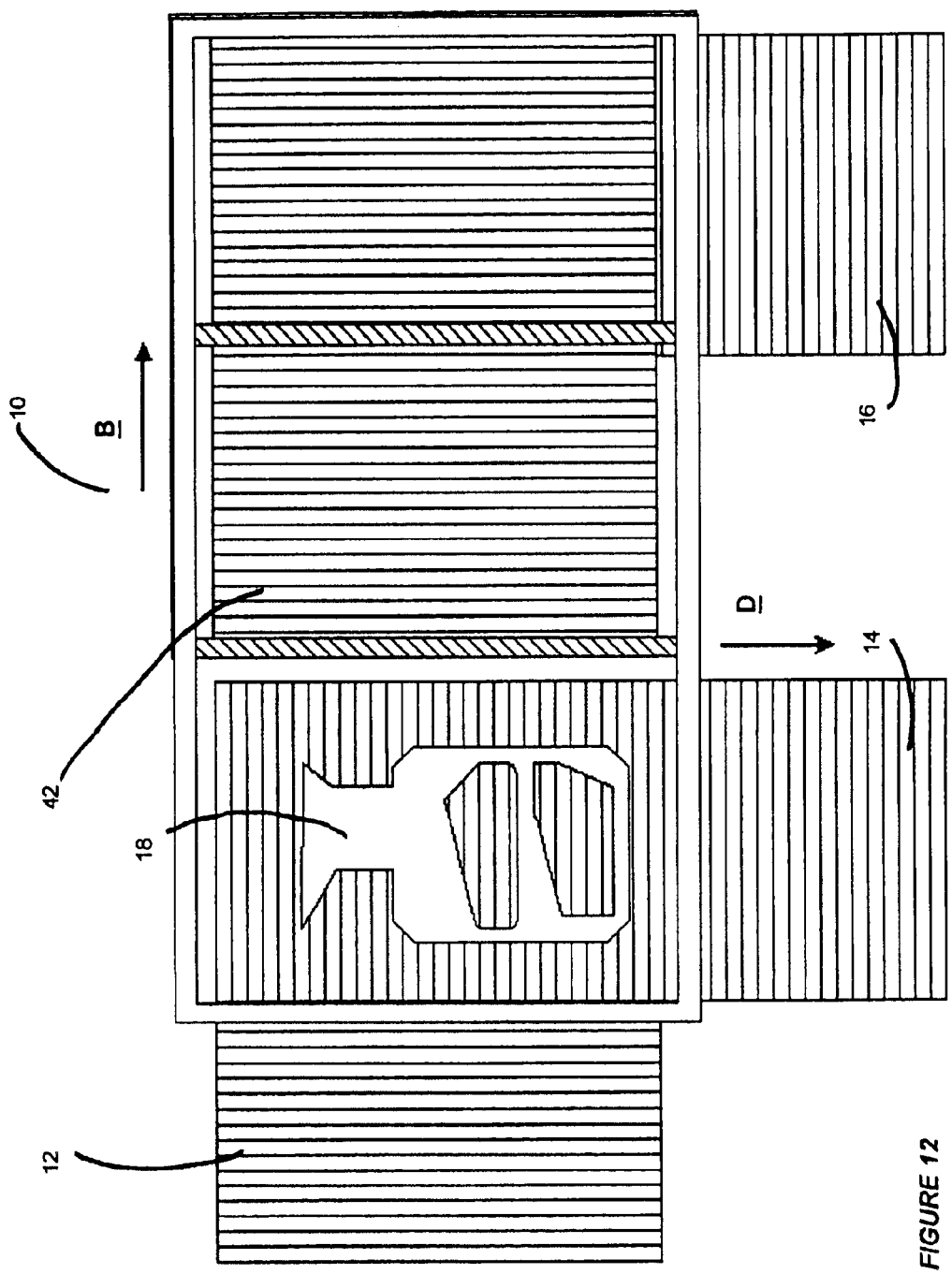
Figure 13:
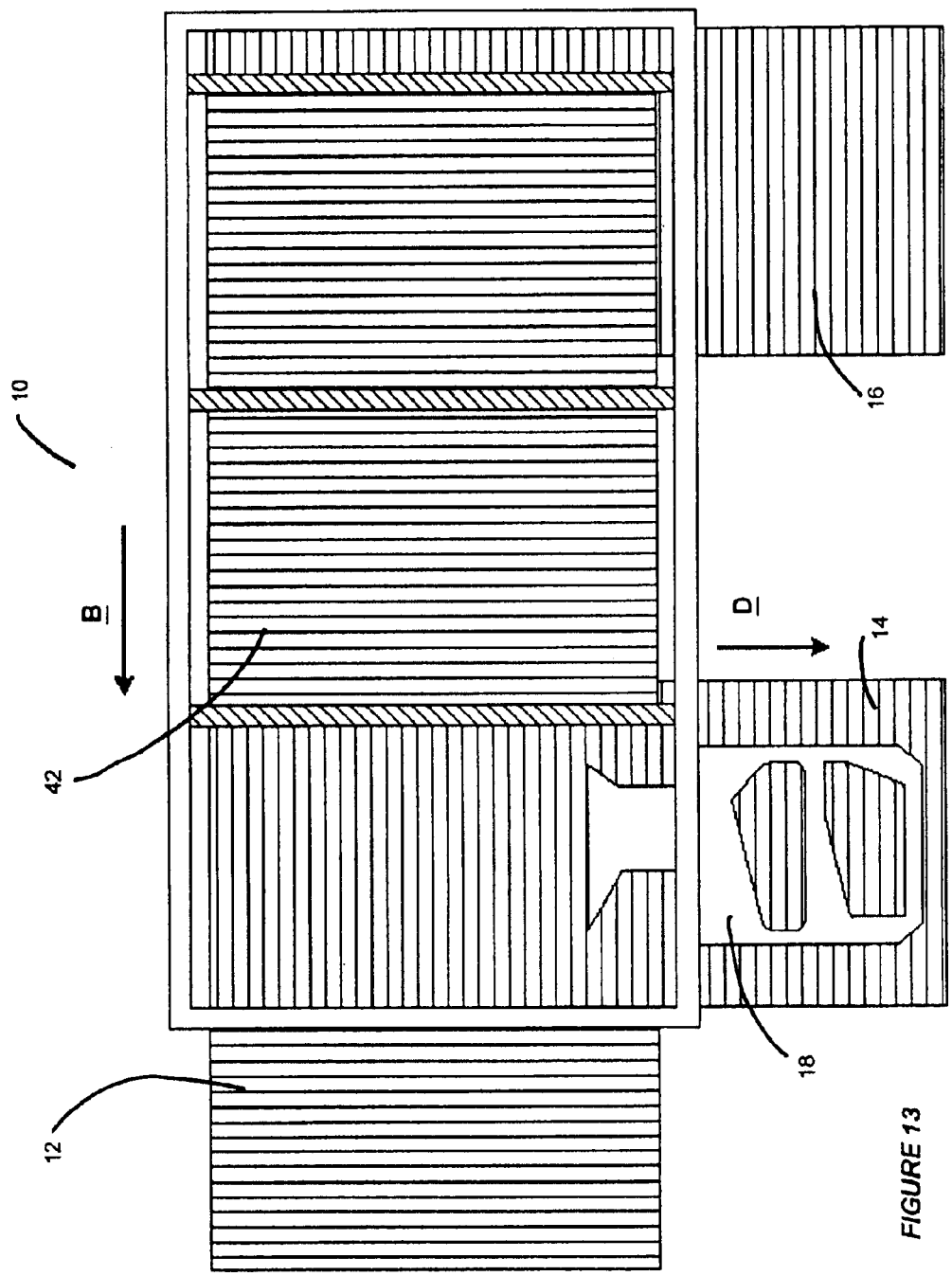

In FIG. 9, conveyor belt 42 is again activated to run in a clockwise direction as workpiece 18 is travelling towards it on input conveyor 12. Workpiece 18 on second output conveyor 16 is being carried away at the same time. FIG. 10 shows workpiece 18 transferred onto conveyor belt 42 such that it is positioned over first output conveyor 14 when conveyor belt 42 is stopped. FIG. 11 shows carriage assembly 20 moving towards the second position and conveyor belt 42 is now being operated in a counter-clockwise direction such that workpiece 18 is being placed on first output conveyor 14. FIG. 12 shows carriage assembly 20 in the second position and workpiece 18 fully positioned on first output conveyor 14. After workpiece 18 is deposited onto first output conveyor 14, conveyor 14 is activated to carry workpiece 18 away from conveyor transfer assembly 10, as shown in FIG. 13. Finally, as workpiece 18 is carried away from conveyor transfer assembly 10, carriage assembly 20 returns to the first position, to await the next workpiece 18.

It would be readily understood by those skilled in the art that there are a wide variety of methods and conveyor controller assemblies for powering rollers 44 to cause the movement of conveyor belt 42 around those rollers. For example a first conveyance actuator such as a motor 43 could be affixed to one of rollers 44 to enable the rotation. When a roller 44 is operated in a clockwise direction, conveyor belt 42 is moved in a clockwise direction. Due to the frictional adhesion between the inter surface of conveyor belt 42 and the outer surface of the cylinder roller, conveyor belt 42 will rotate around rollers 44 and any workpieces resting on working surface 46 will be carried in the direction of the rotation. Likewise, when a roller 44 is operated in a counter-clockwise direction, conveyor belt 42 is moved in a counter-clockwise direction by a second conveyance actuator such as the same motor 43 being operated in reverse.

It will also be appreciated by those skilled in the art that the movement of carriage assembly 20 from the first position to the second position within support frame 22 may be accomplished by a wide variety of methods. Generally, a linear actuator will operate to move carriage assembly 20. The linear actuator may be a timing belt, a pneumatically powered mechanism or any other linear actuator known to those skilled in the art. In this example, a pneumatically powered piston 45 is shown attached to support frame 22 and carriage assembly 20.

Figure 16:
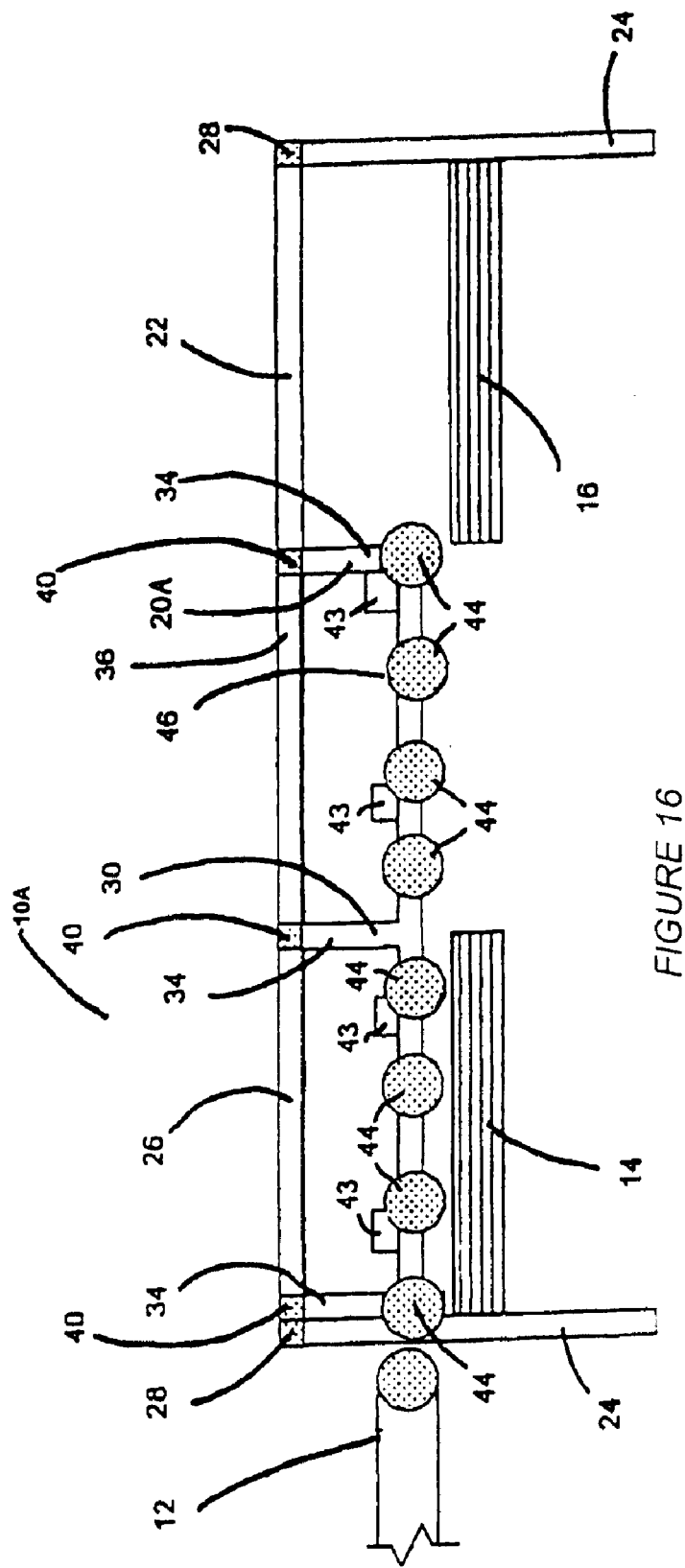
FIG. 16 shows a sectional side view of an alternative construction.

In addition, instead of conveyor belts, any of the conveyors described herein may be substituted by a series of parallel cylindrical rollers or wheels or other methods of conveyance known in the art as shown in FIG. 16, wherein a series of rollers 44 is shown wherein every second roller 44 is powered by a motor 43.

In addition, given the application of this conveyor transfer assembly 10 in high-speed manufacturing operations, the operation of each of the input and output conveyors as well as conveyor belt 42 is preferably computer controlled to achieve the desired high-speed operation. In addition, the movement of carriage assembly 20 within support frame 22 is preferably controlled by the same computer. In addition, appropriate sensor devices may be used to control the timing of the activation of each of the conveyor belts during the transfer sequence described above. As well, the rate of speed of the belts and of the carriage may be adjusted as desired by the user or automatically by the computer as detected by sensors if, for example, workpiece 18 is not deposited centrally on one of the output conveyors.

It will be also apparent to those skilled in the art that conveyor transfer assembly 10 may be used in a wide variety of transfer situations a single input conveyor to multiple output conveyors. For example three or more output conveyors could be positioned within support frame 22 and conveyor transfer assembly 10 can operate to move such that the transfers take place at multiple positions. In addition one of first and second output conveyors may need operate to move workpieces 18 in the same direction as input conveyor 12. In fact, second output 16 could be positioned such that in a direction that it runs along the same line of input conveyor 12 and conveyor belt 42. Finally while the carriage preferably moves linearly so as to ease the controls required for starting and stopping carriage assembly 20 and the operation of rollers 44, would be obvious to those skilled in the art that lateral track rails 26 may be curved to allow carriage assembly 20 to travel around a corner to deposit the workpiece at a different location. Such a configuration maybe desired when assembly 10 is installed into an existing facility which already has defined output stations.

In another variation of the preferred embodiment, first and second output conveyors 14 and 16 could be positioned such that both conveyors are spaced apart from input conveyor 12. In such a configuration, the process of transferring workpiece 18 to each of the output conveyors is identical, with the exception that carriage assembly moves between a first position proximate to input conveyor 12, a second position over first output conveyor 14 and a third position over output conveyor 16. As a result, conveyor belt 44 only needs to be rotatable in the clockwise direction.

In yet another variation of the preferred embodiment, input conveyor 12 may transfer a pair of workpieces 18 side-by-side simultaneously to carriage assembly 20. A pair of output conveyors may be provided which run perpendicular to conveyor 40. The output conveyors run colinear to one another and in opposite directions such that when conveyor 40 deposits the workpieces onto the output conveyors, one workpiece is deposited on one of the output conveyors while the other workpiece is deposited on the other conveyor. The output conveyors may then be activated to take the workpieces in opposite directions.

Figure 14:
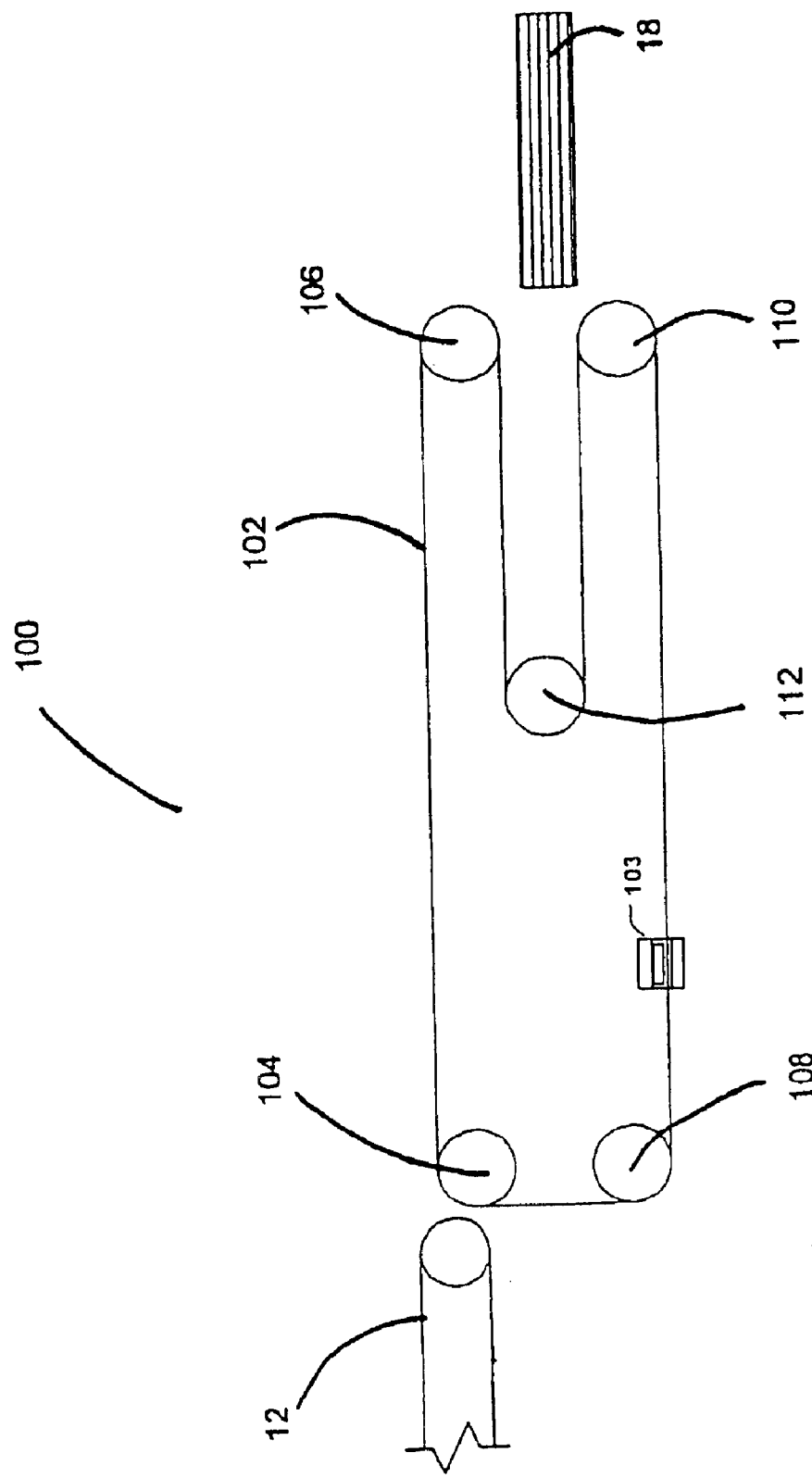
FIG. 14 shows a side view schematic of a telescoping conveyor transfer assembly in accordance with the present invention with the output end in a first position.

In yet another version of the present invention, workpieces 18 may be transferred from input conveyor 12 to an output conveyor by means of a telescoping conveyor 100 as shown in FIG. 14. Telescoping conveyor assembly 100 is composed of a conveyor belt 102 and a series of five rollers about which conveyor belt 102 is looped. Upper stationary roller 104 and upper moving roller 106 define the horizontal level at which a workpiece is transferred. Lower stationary rollers 108 and 10 are positioned a horizontal plane below that of the upper rollers. Midlevel moving roller 112 lies vertically between the upper rollers and the lower rollers and horizontally between upper stationary roller 104 and upper moving roller 106. In addition, midlevel moving roller 112 lies horizontally between lower stationary rollers 108 and 10. Conveyor belt 102 is looped such that rollers 104, 106, 108 and 110 lie within the loop, while midlevel moving roller 112 lies outside of the loop. The portion of conveyor belt 102 between the bottom of midlevel moving roller 112 and the top of lower stationary roller 110 is parallel to the portion of conveyor belt 102 that lies between upper rollers 104 and 106.

Figure 15:
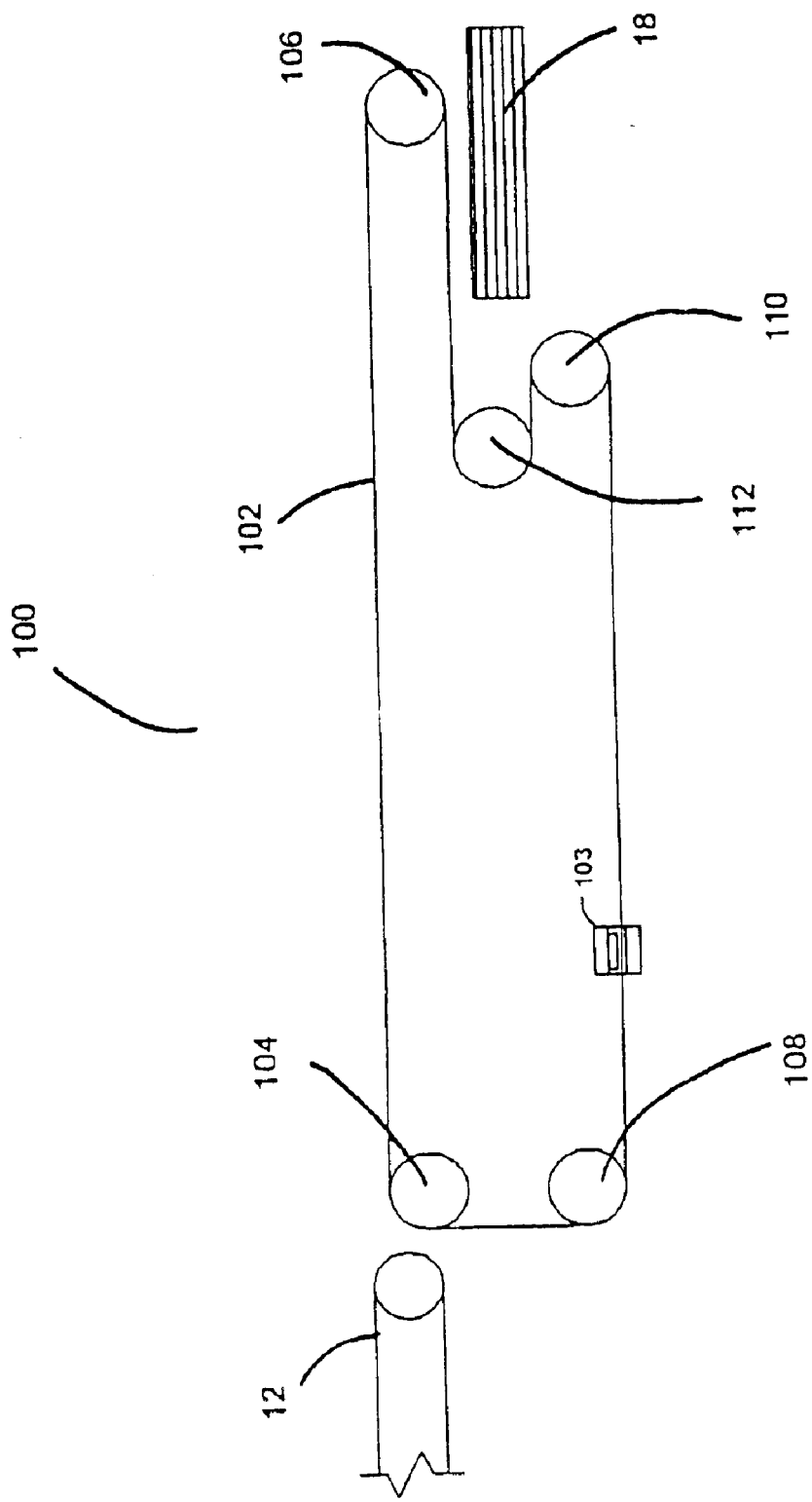
FIG. 15 shows a side view schematic of the conveyor transfer of FIG. 14 with the output end in the second position.

Midlevel moving roller 112 and upper moving roller 106 are affixed to one another and are laterally moveable from a first position as shown in FIG. 14 to a second position as shown in FIG. 15. This serves to lengthen the working surface of conveyor belt 102. Conveyor belt 102 remains at a constant length provided that roller 112 does not move beyond (i.e. to the right of, as shown in FIG. 15) roller 110. Conveyor assembly 100 also includes a conveyor stop member (such as a clamp 103, or a sliding bar passing through a corresponding hole in the conveyor belt, or other such apparatus known in the art) which acts to keep conveyor belt 102 stationary with respect to upper stationary roller 104, even while moving rollers 106 and 112 are in motion.

In operation, conveyor belt 102 receives a workpiece from an input conveyor and transports it by activating one of the rollers to rotate conveyor belt 102. Initially, the moving rollers are in the first position. As the workpiece is transported laterally along conveyor belt 102, moving rollers 106 and 112 move away from the input conveyor such that the end of the conveyor surface furthest from the input conveyor is positioned vertically over the desired output position (i.e. the moving rollers are in the second position). This motion acts to extend the working surface of conveyor belt 102. The roller driving conveyor belt 102 is stopped when the workpiece lies directly over the desired output position and the stop member is activated to keep conveyor belt 102 stationary with respect to the stationary rollers. Moving rollers 106 and 112 are then retracted to the first position and the workpiece is deposited onto the desired output position (for example, a transverse conveyor belt. The action of depositing the workpiece directly below its previous position is accomplished by conveyor belt 102 moving with respect to the workpiece at the same speed (but in the opposite direction) as that of the moving rollers when they are retracted.

It would be obvious to those skilled in the art that conveyor assembly 100 could be designed such that moving rollers 106 and 112 could move to a third position beyond the second position and deposit the workpiece on a second output destination such as a second transverse output conveyor.

It will also be appreciated by those skilled in the art that the conveyors need not travel in a horizontal plane. Each of the conveyors can be slanted on an angle as required by the manufacturing process.

In another variation of the assembly, the apparatus need not include first and second output conveyors 14 and 16. Conveyor transfer assembly 10 may be used to place workpieces 18 in one of two or more output positions. For example, two bins may be positioned in place of each of the output conveyors to collect the workpieces as they are deposited by conveyor belt 44.

Other modifications and alterations maybe used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope particular characteristic; e.g., substantially vertical is intended to mean perpendicular to a horizontal orientation, or near so, and or exhibiting characteristics associated with a general vertical element or orientation.

What is claimed is:

1. A transfer assembly for transferring articles from an input conveyor to an output position, the transfer assembly comprising:

(a) a support structure;

(b) a conveyor assembly mounted to said support structure, said conveyor assembly having a working conveyor surface, said working conveyor surface having an input end and an output end, said output end being moveable in a substantially lateral direction between a first position and a second position, said first position being such that said working conveyor surface is substantially laterally positioned away from the output position, said second position being such that a portion of said working conveyor surface is positioned above the output position;

(c) a linear actuator mounted to said output end, said linear actuator adapted for moving said output end between said first position and said second position; and (d) a conveyor controller assembly coupled to said conveyor surface, said conveyor controller assembly being adapted to selectively translate said working conveyor surface with respect to said input end; said conveyor controller assembly being adapted to selectively maintain at least a portion of said conveyor surface stationary with respect to said support structure.

2. A transfer assembly as claimed in claim 1, wherein said conveyor controller assembly includes a first conveyance actuator adapted to selectively translate said conveyor surface with respect to said input end.

3. A transfer assembly as claimed in claim 2, wherein said conveyor controller assembly further includes a conveyor stop for selectively maintaining at least a portion of said conveyor surface stationary with respect to said support structure when said linear actuator is moving said output end.

4. A transfer assembly as claimed in claim 3, wherein said conveyor stop includes a clamp positioned about said working conveyor surface, said clamp being operable to releasably grasp a portion of said working conveyor surface.

5. A transfer assembly as claimed in claim 2, wherein said conveyor controller further includes a second conveyance actuator adapted to selectively translate said working conveyor surface with respect to said input end in a direction opposite to that of said first conveyance actuator.

6. A transfer assembly as claimed in claim 5, wherein said linear actuator is adapted to move said output end at a first speed in a first direction, and second conveyance actuator is adapted to selectively translate said working conveyor surface with respect to said input end at a rate substantially equal to said first speed in a second direction, said second direction being opposite to said first direction, whereby when said linear actuator is activated in a first direction and said second conveyance actuator is activated to translate said working conveyor surface in said second direction, a portion of said working conveyor surface is stationary with respect to said support structure.

7. A transfer assembly as claimed in claim 1, wherein said working conveyor surface has a fixed length in the lateral direction as said output end is moved from said first position and said second position.

8. A transfer assembly as claimed in claim 1, wherein said working conveyor surface has a variable length in the lateral direction when said output end is moved from said first position and said second position.

9. A transfer assembly as claimed in claim 8, wherein said input end is mounted to a fixed position with respect to said support structure.

10. A transfer assembly as claimed in claim 1, wherein said conveyor assembly includes at least two conveyor rollers and a conveyor belt looped around said conveyor rollers, said working conveyor surface being an uppermost surface of said conveyor belt.

11. A transfer assembly as claimed in claim 10, wherein said conveyor controller assembly includes a motor mounted to rotate one of said conveyor rollers.

12. A transfer assembly as claimed in claim 1, wherein said conveyor assembly includes a series of parallel cylindrical rollers, said working conveyor surface being the combination of the upper portions of said parallel cylindrical rollers.

13. A transfer assembly as claimed in claim 12, wherein said conveyor controller assembly includes a motor mounted to rotate at least one of said conveyor rollers.

14. A transfer assembly as claimed in claim 1, further comprising an electronic controller for activating said linear actuator and for operating said conveyor control assembly.

15. A process for transferring articles from an input conveyor to an output position using a transfer assembly, the transfer assembly having a support structure and a conveyor assembly mounted thereon, the conveyor assembly having a working conveyor surface extending between an input end and an output end, the output end being movable between a first position and a second position, the first position being such that the working conveyor surface is substantially laterally positioned away from the output position, the second position being such that a portion of the working conveyor surface is positioned above the output position, the process comprising the steps of:

(a) transporting the article along the input conveyor towards the transfer assembly in a generally lateral direction;

(b) translating the working conveyor surface with respect to the support structure in said generally lateral direction;

(c) transferring the article from the input conveyor to the working conveyor surface;

(d) moving the output end to the second position;

(e) translating the working conveyor surface such that the article is positioned substantially above the output position;

(f) maintaining at least a portion of the working conveyor surface stationary with respect to the support structure while moving the output end to the first position, whereby the article is transported vertically downwardly to the output position.

16. A process as claimed in claim 15, wherein the output position is the upper surface of an output conveyor, the output conveyor being adapted to move in a direction transverse to the generally lateral direction.

17. A process as claimed in claim 15, wherein step (f) is performed by moving the output end to the first position at a first speed and in a first direction while translating the working conveyor surface with respect to the input end at a rate substantially equal to the first speed and in a second direction, the second direction being opposite to said first direction.

* * * * *